US011537693B2

United States Patent
Solano et al.

(10) Patent No.: US 11,537,693 B2
(45) Date of Patent: Dec. 27, 2022

(54) KEYBOARD AND MOUSE BASED BEHAVIORAL BIOMETRICS TO ENHANCE PASSWORD-BASED LOGIN AUTHENTICATION USING MACHINE LEARNING MODEL

(71) Applicant: EASY SOLUTIONS ENTERPRISES, CORP., Coral Gables, FL (US)

(72) Inventors: Jesus Solano, Bogota D.C. (CO); Lizzy Tengana, Bogota D.C. (CO); Alejandra Castelblanco, Bogota D.C. (CO); Esteban Rivera, Bogota D.C. (CO); Christian Lopez, Bogota D.C. (CO); Martin Ochoa, Bogota D.C. (CO)

(73) Assignee: EASY SOLUTIONS ENTERPRISES, CORP., Coral Gables, FL (US)

( * ) Notice: Subject to any disclaimer, the term of this patent is extended or adjusted under 35 U.S.C. 154(b) by 388 days.

(21) Appl. No.: 16/798,084

(22) Filed: Feb. 21, 2020

(65) Prior Publication Data

US 2021/0264003 A1 Aug. 26, 2021

(51) Int. Cl.
*G06N 5/00* (2006.01)
*G06F 21/31* (2013.01)
*G06N 20/20* (2019.01)

(52) U.S. Cl.
CPC ........... *G06F 21/316* (2013.01); *G06N 5/003* (2013.01); *G06N 20/20* (2019.01)

(58) Field of Classification Search
CPC ....... G06F 21/316; G06N 20/20; G06N 5/003
See application file for complete search history.

(56) References Cited

U.S. PATENT DOCUMENTS

| | | | |
|---|---|---|---|
| 2006/0139148 A1* | 6/2006 | Faro | G07C 9/27 340/5.73 |
| 2010/0153451 A1* | 6/2010 | Delia | G06F 21/316 707/E17.014 |
| 2013/0159217 A1* | 6/2013 | Davis | H04L 63/10 705/400 |
| 2013/0167216 A1* | 6/2013 | Rodriguez | G06F 21/316 726/7 |
| 2017/0140279 A1* | 5/2017 | Turgeman | G06F 21/36 |

* cited by examiner

*Primary Examiner* — Pakee Fang
(74) *Attorney, Agent, or Firm* — Greenberg Traurig (57) ABSTRACT

In one approach, a method includes: receiving a login event input from a user, the login event input being associated with a session of the user logging into an account; accessing a machine learning model; and authenticating, with the machine learning model, the user for the account, based at least in part on the login event input. In examples, the login event input comprises one or more items of biometric data associated with the user, an item of the one or more items of biometric data associated being generated by interaction of the user with an input device for logging into the account, and the interaction communicating a login credential of the user. In examples, an item of the one or more items of biometric data associated with the user is keyboard event-related biometric data, or mouse event-related biometric data.

14 Claims, 6 Drawing Sheets

KEYBOARD AND MOUSE BASED BEHAVIORAL BIOMETRICS TO ENHANCE PASSWORD-BASED LOGIN AUTHENTICATION USING MACHINE LEARNING MODEL

FIELD OF THE TECHNOLOGY

At least some embodiments disclosed herein relate generally to user authentication, and more particularly to, biometrics based user login authentication using machine learning models.

BACKGROUND

Traditional password-based authentication techniques are popular with applications such as online services. For example, financial institutions oftentimes offer their customers online access to services via web-based portals. However, such password-based authentication mechanisms are susceptible to various attacks. For example, overly simple passwords are subject to brute-forcing and guessing by malicious parties; and complex passwords can nevertheless be stolen during data breaches, or spoofed by domain specific malwares targeting financial institutions.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein may authenticate a user based on biometric data collected from the user performing a login session to access an account of the user. As used herein, a login or login session includes a process through which a user is authorized for accessing resources (e.g., services, applications, databases, cloud based functionalities). During the login session, the user may generate one or more login event inputs to provide, for example, login credentials such as a pair of username and corresponding password as part of the login process. In doing so, the user may interact with one or more input devices associated with a client device on which the login is performed. In some embodiments, the user may interact with a keyboard of the client device to enter the credential, interact with a mouse at various points of time in relation to or independent from interacting with the keyboard, or otherwise interact with the one or more input devices to login the account.

In some embodiments, a service provider and/or a third-party security service collects and records data associated with login event inputs obtained from user login sessions. For example, a service provider and/or third-party security service may monitor and record information including user biometric data generated by the user interacting with the above-described input devices during logins. For example, biometric data may include one or more of the biometric data related to keyboard event, biometric data related to mouse event, and biometric data related to other input device events (e.g., human-machine interaction events).

Using the biometric data associated with the sessions of the user logging into the account, a machine learning model is trained to authenticate the user based on the biometric data collected during a user login session, in addition to or independent of the static authentication based on the verification of the matching of the username to the password.

The embodiments of the present disclosure provide advantages and improvements over the conventional biometric based user authentications. First, a relatively small of threshold numbers of training sessions achieves a balance between a higher exposure to security risks and a more accurate authentication model. Like most of the training of machine learning techniques, the more data (e.g., not finalizing the machine learning model until after a larger number of login sessions) used for training a model, the more accurate the model is to produce an output. However, in the setting of login based security verification, such longer window of time for collecting training data also leads to increased risks of not being able to catch any suspicious login sessions. Unlike the other techniques, the authentication model of some embodiments of the present disclosure is trained with few user login sessions for authenticate the user with practical accuracy. Second, with built-in bias towards heightened sensitivity to false negatives and tolerance to false positives, the machine learning model catches more instances where the user is suspected of being an illegitimate user of the account. Nevertheless, such suspicious logins can be re-verified by other security measures such as a secondary authentication. Third, the machine learning generated and trained according to the embodiments of the present disclosure can be applied in conjunction with other authentication models. For example, the machine learning model can be applied with models that analyze and profiling users based on a computer IP address, geo-address, browser fingerprint information, login time patterns, etc.

Figure 1:
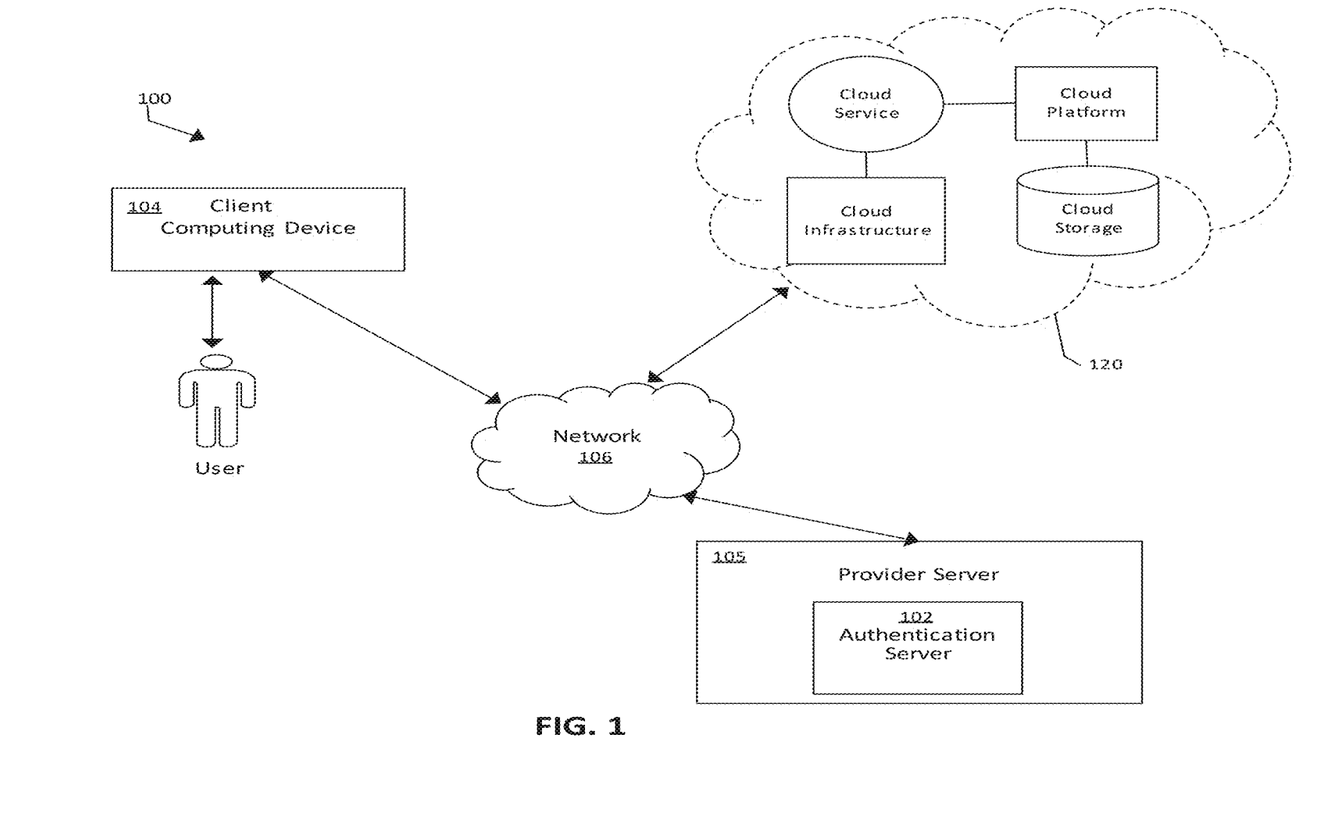
FIG. 1 shows an exemplary computing environment that may be used in conjunction with various embodiments of the present disclosure.

Referring now to FIG. 1, an exemplary computing environment 100 that may operate in conjunction with embodiments of the present disclosure is depicted. The components of the computing environment 100 may be implemented using any desired combination of hardware and software components. Alternatively, or additionally, system 200 of FIG. 6 (or any portion thereof) may be included in the computing environment 100.

In the example shown in FIG. 1, the exemplary computing environment 100 may include a client computing device 104, a provider server 105, an authentication server 102, and a cloud component 120, which communicate with each other over a network 106.

The client computing device 104 may be any computing device such as desktop computers, laptop computers, tablets, PDAs, smart phones, mobile phones, smart appliances, wearable devices, IoT devices, in-vehicle devices, and so on. According to various embodiments, a user of the client computing device 104 performs a login session in order to access the services at the provider server 105.

The client computing device 104 may include one or more input devices or interfaces for the user of the client computing device 104 to interact therewith. For example, the one or more input devices or interfaces may include one or more of: a keyboard, a mouse, a trackpad, a trackball, a stylus, a touch screen, a hardware button of the client computing device 104, and the like. The client computing device 104 may be configured to execute various applications such as a web browser application to access the network 106.

Provider server 105 may be any computing device configured to host one or more applications/services. In some embodiments, the provider server 105 may require security verifications before granting users the access to the services and/or resources provided thereon. In some embodiments, the applications/services may include online financial services through which users may engage once authenticated for access via logging into their online accounts. In some embodiments and as shown in FIG. 1, the provider server 105 may be configured with an authentication server 102 for authenticating users. In other embodiments, an authentication server 102 may be configured remotely and/or independently from the provider server 105.

Authentication server 102 may be any computing device configured to authenticate various users based on the biometric data collected during their logins according to some embodiments of the present disclosure. In various embodiments, the authentication server 102 may be configured as part of the provider server 105 (as shown herein and described above), independent/remotely from the provider server 105, at the client computing device 104, or at any computing device that is peer to the client computing device 104 (e.g., other client computing devices).

Network 106 may be any type of network configured to provide communication between components of system 100. For example, network 106 may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of system 100. In other embodiments, one or more components of system 100 may communicate directly through a dedicated communication link(s).

In various embodiments, the computing environment 100 may also include one or more cloud components 120. Cloud components 120 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of the provider server 105 and the authentication server 102 may be configured to operate in or with cloud computing/architecture such as: infrastructure a service (IaaS), platform as a service (PaaS), and/or software as a service (SaaS).

While only one client computing device 104, provider server 105, authentication server 102, cloud component 120, and network 106 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

According to various embodiments, during a session, the user logs into an account of the user via an online application (e.g., a portal, a web page) at a client computing device, and the user generates one or more login event inputs at the client computing device. In some embodiments, the user provides the credential associated with the account via one or more input devices or interfaces of the client computing device. In some embodiments, the user enters the credential via input devices such as a keyboard, a mouse, a trackpad, a trackball, a stylus, and the like. In other embodiments, the user enters the credential via interfaces such as a touch screen, embedded buttons of the client computing device.

According to various embodiments, one or more login event inputs may include one or more items of biometric data associated with the user while generating the inputs during a login session. In some embodiments, in order to collect the user's biometric data from the human-machine interaction during the user login session, mouse movements and keyboard strokes performed by the user during the login can be obtained. Various suitable techniques may be applied to track mouse movements and keystrokes incurred by the user at the client computing device at which the user performs login sessions. In some embodiments, a Javascript code can be embedded in a login webpage to track mouse dynamics and/or keyboard dynamics. In other embodiments, a software module plug-in downloaded and installed by the user to the client computing device is used to track mouse movements and/or keystrokes. In one implementation, the mouse event data and/or the keystroke event data may be aggregated on the client side for further analysis.

Mouse movement data collected via a tracking tool provides a multitude of information regarding the mouse movement. For example, raw mouse movement data may include the location of the mouse (e.g., in terms of pixels), timestamps, hovering location, hovering duration, mouse clicks (right clicks, left clicks, double clicks, etc.), drag drop, and the like. In some example, high level abstraction such as heat maps and playbacks can be generated based on raw mouse movement data.

In one embodiment, the above-described raw mouse movement data collected from the user login session is represented as a plurality of tuples of a pair of a timestamp and a cartesian coordinate of the mouse. Based on the plurality of tuples of mouse movement data, various analysis can be performed to extract mouse movement features associated with the user performing a login into an account.

Figure 2:
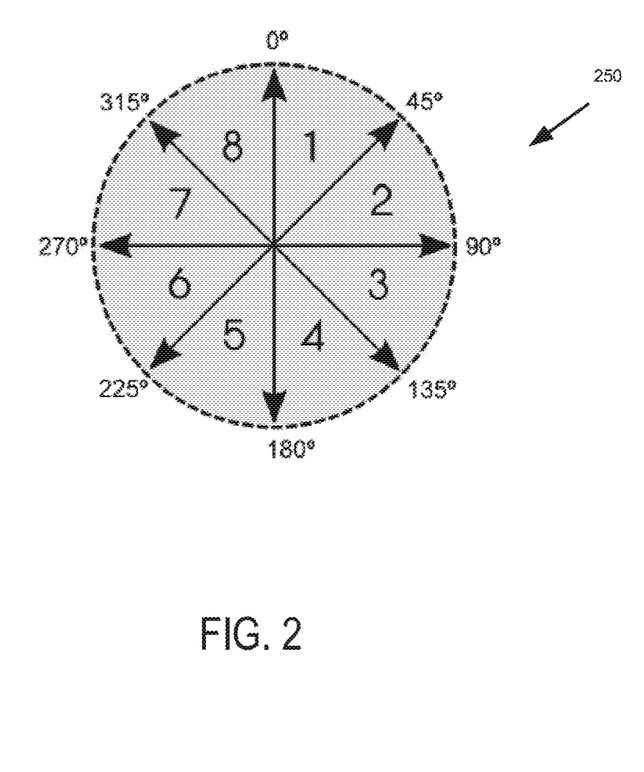
FIG. 2 shows an exemplary mouse movement space segmentation according to various embodiments of the present disclosure.

FIG. 2 illustrates an exemplary mouse movement space according to some embodiments of the present disclosure. In this example, a mouse movement space is defined for the purpose of analyzing the tuples of mouse movement data. As shown in FIG. 2, a two-dimensional movement space 250 of 360 degrees is identified as the mouse movement space. Further, the mouse movement space 250 is segmented into a plurality of distinct directions of movements. According to various embodiments, the mouse movement space 250 can be segmented into any number of directions. In some embodiments, the plurality of distinct directions segments the mouse movement space 250 evenly. In other words, each of the plurality of the directions separates from others by the same amount of degree. In other embodiments, a direction of the plurality of distinct directions may be separated from another direction of the plurality of distinct directions by different degrees. That is, the plurality of directions are not evenly distributed across the 2D space of 360 degrees. In one implementation, the plurality of distinct directions includes eight (8) distinct directions (as shown in labels 1 through 8) evenly segmenting the mouse movement space 250, separating from each other by 45 degrees.

In some embodiments, mouse movement features are extracted from the tuples of raw mouse movement data based on the defined movement space segmented with the plurality of directions. In one embodiment, an average speed in each of the segmented directions is computed for the mouse movement during a login session. Further, a movement histogram relative to the segmented directions is also computed for the mouse movement during a login session. Such movement histogram captures the percentage of movements performed by the user in each direction during the login session. In one implementation, a set of average speeds in each of the eight (8) segmented directions is computed as the first set of point-by-point mouse movement features. The direction histogram in each of the eight (8) segmented directions is computed as the second set of point-by-point mouse movement features.

Figure 3:
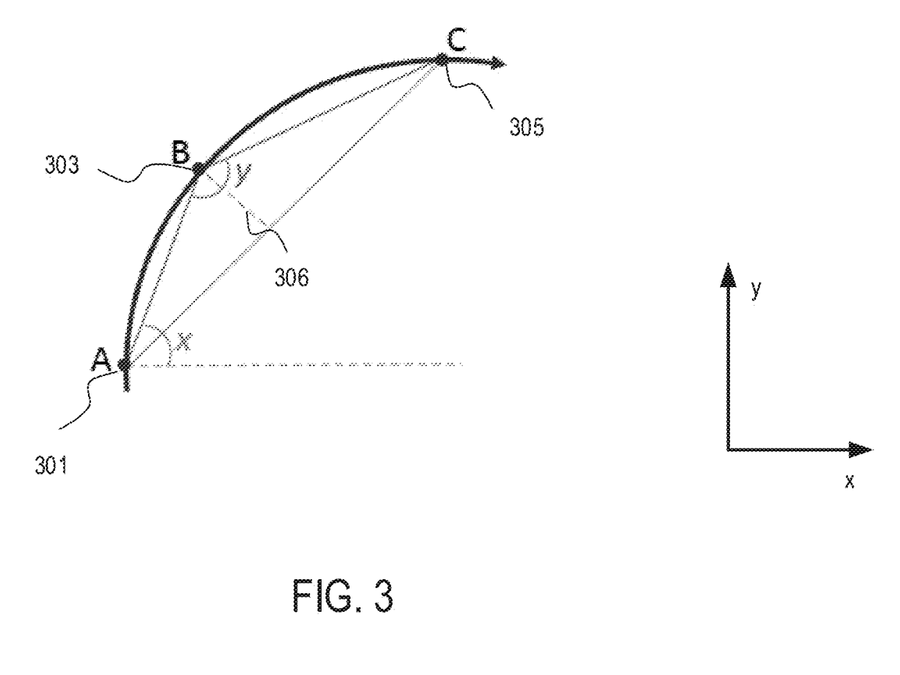
FIG. 3 shows an exemplary angle-based mouse movement metrics according to various embodiments of the present disclosure.

FIG. 3 illustrates an exemplary angle-based mouse movement metrics according to some embodiments of the present disclosure. Mouse movement features can also be extracted in terms of angle-based characteristics of the movements. As shown in FIG. 3, a mouse movement is depicted to illustrate an exemplary three consecutive points: point A 301, point B 303, and point C 305. For two consecutive points A 301 and B 303, a direction is computed to capture the direction along which the mouse movement travels from point A 301 to point B 303. In one implementation and as shown herein, such direction is computed as the angle x between the AB line and the horizontal axis x.

For three consecutive points A 301, B 303, and C 305, an angle of curvature is computed to capture a curved angle via which the mouse movement travels from point A 301 through point B 303 and to point C 305. In one implementation and as shown herein, such angle is computed as the angle y between the AB line and BC line.

In various embodiment, one or both the angle x and angel y can be characterized using any suitable level of granularity of degrees. In one embodiment, one or both of the angel x and angle y are characterized into groups of 3 consecutive degrees of, for example, a first group including an angle of 1 degree, 2 degrees, and 3 degrees; a second group including an angle of 4 degree, 5 degrees, and 6 degrees; and so on. As such, mouse movement data extracted in terms of an angle x is characterized in a total of 120 features (e.g., 360 degrees of freedom divided by 3), and mouse movement data in terms of an angle y is characterized in a total of 60 features (e.g., 180 degrees of freedom divided by 3). In some embodiments, a plurality of granularity degrees segment the respective degrees of freedom in an uneven manner.

Also for three consecutive points A 301, B 303, and C 305, a curvature distance is computed to capture how the mouse movement travels from point A 301 through point B 303 and to point C 305. In one implementation and as shown herein, such distance is computed as a ratio of: the length of the AC line connecting point A 301 and point C 305 to the distance 306 from point B 303 to the AC line. As a curvature distance is extracted using a ration of two length, the curvature distance is unitless.

In various embodiments, the above-described curvature distance can be characterized using any suitable level of granularity. In one embodiment, a curvature distance is characterized using a group of values specified by a maximal value and a granularity degree. For example, such group may specify a value of 0.02 in term of granularity, and a maximum value of 1.52. As such, mouse movement data extracted as the curvature ratio is characterized in a total of 76 features (e.g., 1.52 divided by 0.02). According to various embodiments, the granularity can be any suitable value, the maximal value can also be any suitable value. In some embodiments, a plurality of granularities are applied to segment the ratio range in an uneven manner.

The above-described features used for analyzing raw mouse movement data are independent or relatively independent of the user's computing environment (e.g., the client computing device 104 of FIG. 1, or the computing system 200 of FIG. 6) in which the user performs a login session. For example, the direction-based metrics and angle-based metrics are not dependent on, the operating system of the client computing device on which the user logs in, or the screen size of the client computing device, or the resolution, or the brand of the mouse, or degree of mouse pointer sensitivity, or the like.

In one implementation, a set of angle-based directions is computed as the third set of point-by-point mouse movement features. A set of angles of curvature is computed as the fourth set of point-by-point mouse movement features. A set of curvature distances is computed as the fifth set of point-by-point mouse movement features. In one example, the raw mouse movement data is extracted into a vector of 272 mouse features, including: an average speed and a standard deviation of average speed in each of the above-described 8 directions (16 features), the above-described 120 features in terms of an angle x, 60 features in terms of an angel y, and 76 features in terms of a curvature distance.

Figure 4:
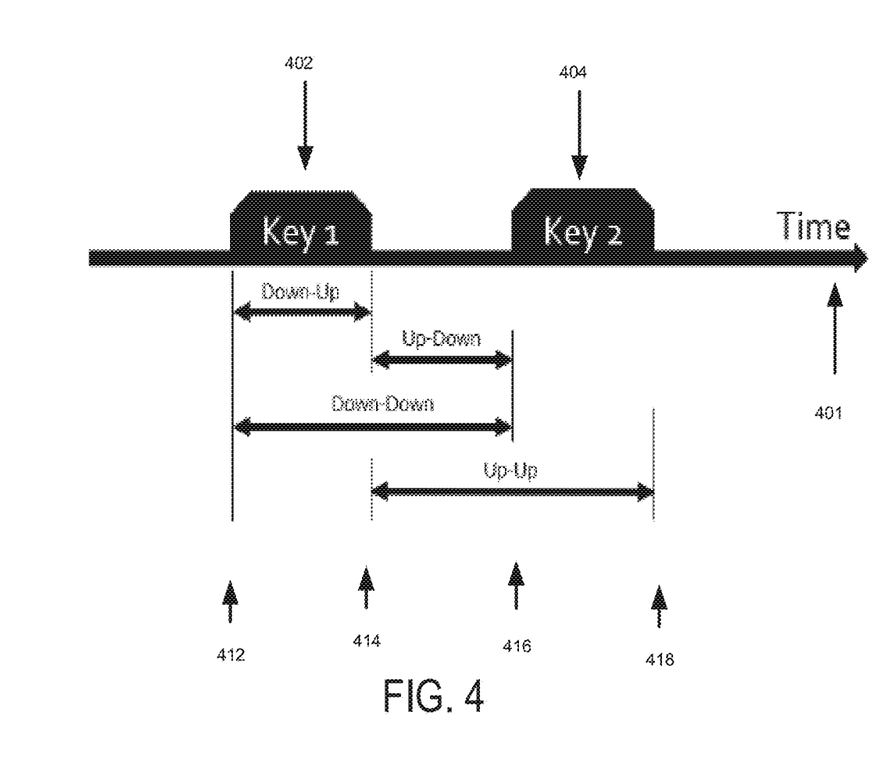
FIG. 4 shows an exemplary timing-based keyboard features according to various embodiments of the present disclosure.

FIG. 4 illustrates an exemplary timing-based keyboard features according to various embodiments of the present disclosure. In some embodiments, a set of timing-related features associated with the keyboard strokes by the user during a login session is used to extract a unique typing patterns or rhythms for the user. Such timing-related features may include the timing information related to the time when a key of a keyboard is pressed or released during the user login session. For example, raw keyboard stroke data may be represented as tuples of: a timestamp, a key identifier, and a key action (e.g., press or release). In one embodiment, the raw keyboard stroke data is anonymized for analysis. Any suitable anonymization techniques (e.g., differential privacy, secure multi-party computation, etc.) can be applied herein. In one implementation, for a keyboard with the traditional design of layouts (e.g., sections and zones), the keyboard is unified into a unique zone to provide an abstraction over the particular keys typed (e.g., keys typed to enter a login credential of the user) thereat.

According to various embodiments, a set of timing metrics are used to capture the timing-related keyboard features. In one implementation and as shown in FIG. 4, a set of exemplary keyboard strokes is depicted to illustrate a key 1 (402) and a key 2 (404). Along a time line 401, key 1 (402) is pressed down at a point of time 412, and released at a point of time 414. Subsequently along the time line 401, key 2 (404) is pressed down at a point of time 416, and released at a point of time 418. A down-up feature computes a time duration from the point of time 412, when a key is pressed down, to the point of time 414, when the same key is released into a up position. A up-down feature computes a latency from the point of time 414, when a first key is released into a up position, to the point of time 416, when the second key (e.g., the next key) is pressed down. A down-down feature computes a latency from the point of time 412, when a first key is pressed down, to the point of time 416, when a second key (e.g., the next key) is pressed down. A up-up feature computes a latency from the point of time 414, when a first key is released into a up position, to the point of time 418, when a second key (e.g., the next key) is released into a up position.

In one embodiment, the timing-related keyboard event metrics are further analyzed to compute a vector of features. In one implementation, one or more of a mean, standard deviation, and median of the above-described four timing metrics are computed to generate a vector of keyboard features, for each user login session. In this example, a vector of keyboard features includes 12 features (e.g., three values associated with the four timing related metrics).

In some embodiments, multimodal biometric data can be utilized to authenticate the user logging into an account. In one embodiment, the extracted vectors of features are fused into a composite, combined vector of features at the feature level into a vector of login features. In one implementation, the above-described vector of mouse features is fused with the above-described vector of keyboard features to generate a vector of login features. In this example, the vector of login features includes a total of 284 features (e.g., the sum of 272 and 12) for each user login session. The vector of login features represents a behavioral biometric profile of the user. In one implementation, a user biometric profile is generated based on the vector of the login features.

In some embodiments, multimodal biometric data is fused at stages that are subsequent to generating vectors of features for purposes of training a machine learning model for authentication based on the multimodal biometric data. In one embodiment, separate machine learning models are used to generate respective intermediary authentication results based on the respective modality of biometric data. Then, an intermediary score is generated based on the respective results related to each of the modality of biometric data. Such intermediary scores are fused to create a risk profile for the user. In another embodiment, separate machine learning models are used to generate respective authentication results based on the biometric data. Next, the authentication results are fused to generate a final machine learning model for classification.

According to various embodiments, any type of biometric data can be fused with any other one or more types of biometric data at any one or more fusion levels for authenticating a user, as well as for generating, training, updating, retraining various machine learning models associated with authenticating the user based on the biometric data.

In various embodiments, the fused vector of login features may be further analyzed to process the biometric data for authentication. In some embodiments, such further process is configured to amplify and/or focus on the difference between the login features of a legitimate user and illegitimate users (e.g., hackers, attackers, fraudsters). In one embodiment, biometric data associated with historical user login sessions is used to compare the difference between the login features associated with a current instance of login session (e.g., an incoming login) and prior instances of login sessions. Any suitable techniques can be applied to taking into account of historical biometric data to authenticate a user. In one example, the mean value of the user biometric data of the user in the last n logins in a feature-wise manner is computed as:

$$h_t(n) = \frac{\sum_{i=t-n}^{t-1} f_i}{n} \quad (1)$$

where $h_t$ is the vector of historical login features, n is the number of sessions to look back into the previous logins of the user, and $f_i$ is the vector of login features from the previous login sessions. Accordingly, for a new incoming login session, a difference is computed as:

$$f_t = |f_t - h_t(n)| \quad (2)$$

where $f_t$ is the vector of login features computed for the new incoming login session, $h_t$ is the vector of the mean historic login features of the last n sessions.

In various embodiments, when it is the same user who performs the logging into an account thereof in a new incoming login session as the one who performs the logging in the prior sessions (e.g., the past n sessions), the absolute difference between the new login session and the prior login sessions is relatively small. In contrast, when a different user (e.g., a user other than the legitimate user, an attacker) performs the logging in in a new incoming login session, the absolute difference between the new login session and the prior login sessions is relatively large. In one example, such large difference indicates a heightened probability of attacks being performed against the user's account.

Once the difference vector is generated, a machine learning model is used to generate an authentication model. In some embodiments, a supervised machine learning model is used as the classifier. In one embodiment, such machine learning model is generated per user so that the authentication model is user-specific. This way, the accuracy detection is increased as well.

In one implementation, a training algorithm is selected such that the machine learning model is trained in a relatively fast manner. With a fast-trained model, despite the large number of users for authentication, it is still scalable to employ the biometric data based login authentication according to the embodiments of the present disclosure.

In various embodiments, any suitable fast training algorithms may be applied. In one embodiment, a random forest (RF) classifier is trained into a machine learning model for authenticating users logging into their respective accounts. The machine learning model receives the input of biometric data associated with a current instance of user login session, and generates an output indicating whether the user is authenticated as the legitimate user or not. In one embodiment, when the machine learning model classifies the current login session as illegitimate user login (e.g., login performed by attacker against a user account, login performed by fraudsters who have stolen the login credentials of a user), the user is denied access to the account, despite the fact that the user enters the correct credentials during the login session. In another embodiment, when the machine learning model classifies the current login session as illegitimate user login, the authenticating process further initiate a secondary authentication for the user. In some embodiments, the machine learning model may be applied with other static and/or risk-based authentication techniques.

In implementations, a secondary authentication can include one or more of: the second factor of two-factor authentication, the nth factor of multi-factor authentication (n greater than one), and the like. For example, the second factor of the two-factor authentication may be an authentication code given to the user as part of the login (e.g., via email or text message). Within an allotted period of time, the user is required to retrieve and enter the code to proceed with the login, after providing the right password associated with the user's account in the first factor part of the two-factor authentication.

In one embodiment, a random forest model is trained with 100 estimators. In one implementation, the model is trained with biometric data associated with a relatively small number of user login sessions. In other words, the last n number of sessions is relatively a small number of session. In one example, the model is trained with biometric data associated with about from three (3) to about seven (7) user login sessions. In one implementation, a login session lasts about 30 seconds by the time the user finishes entering the credential for accessing the account. In this example, the authentication model is generated in a "few shot" manner as the model learns from few login sessions. As such, the authentication model is generated relatively fast comparing to other techniques monitoring user biometric data.

In one implementation, a first difference vector computed from biometric data associated with historical login sessions of the legitimate user is computed. A second different vector computed from biometric data associated with historical login sessions of illegitimate users is computed. In other words, the first different vector trains the machine learning model to recognize the unique biometric information associated with the legitimate user; while the second difference vector trains the machine learning model to recognize biometric information as not being associated with the legitimate user. In implementation, the first difference vector may be positive training data, and the second difference vector may be negative training data.

In some implementations, as the training biometric data is obtained from a few user login sessions (e.g., about 3 to 7 sessions), the first difference vector computed from such training session of the legitimate user login is duly limited. On the other hand, the training sessions based which the second difference vector is computed are available from a variety of users other than the legitimate user himself or herself performing logins. As above-described, the latter training sessions can be identified as various attacks on a particular account, or generated by any random other users logging into the account. As such, the biometric data associated with the training sessions of the legitimate user logins is the minority data class, while the biometric data associated with the training session of illegitimate users' logins is the majority data class. As such, due to the few-shot nature of the training of the machine model, the dataset (the combined minority dataset and the majority dataset) is not balanced in its raw state.

To train the machine learning model with a balanced data set, any suitable one or more oversampling techniques may be applied to the minority dataset. In one embodiment, with the random oversampling technique, the minority dataset is supplemented by multiple copies of some or all of the biometric data associated with the legitimate user login sessions. In one implementation, the copies of the biometric data associated with the legitimate user login sessions is multiplied by ten times (e.g., oversampling ten times). For example, with the biometric data from the past n legitimate user login sessions being multiplied into n*10 amount of data, n*10 number of negative training samples (e.g., data from illegitimate user login sessions by random other users, at other computers) is obtained to train the model. In this example, oversampling techniques further render the machine learning model robust in classification tasks.

In other embodiments, the minority dataset may also be oversampled by techniques such as Synthetic Minority Over-sampling Technique (SMOT), and Adaptive Synthetic (ADASYN) techniques.

In one implementation, with a machine model trained with the above-described training data (e.g., n being about 5, and positive training sessions being supplemented to 50, and negative training sessions being 50 as well), a FRR (False Rejection Rate) of 10.73% and a FAR (False Acceptance Rate) of 23.34% is achieved for authenticating a user within a time window of less than 30 seconds on average.

In some embodiments, various datasets are obtained to evaluate and fine tune the training of a machine learning model. In one implementation, every user (e.g., the legitimate user and other users) performs n login sessions with the same pre-determined username and corresponding password. As such, all the users are providing the same login credential for both the training and testing of the machine learning model. This way, except for the legitimate user, the other users are providing negative training data. Using this dataset, the machine learning model is validated when the model has learned of the legitimate user's biometric behaviors during login sessions, instead of the literal information of the username and password. Table 1 provides an example of login sessions used to train and evaluate the machine learning model in this scenario.

TABLE 1

|  | Legitimate user class | Attack class |
| --- | --- | --- |
| Train | n sessions of $u_i$ writing $(U, P)_{fixed}$ | n random sessions from $U_j$ writing $(U, P)_{fixed}$ |
| Test | The remaining m sessions of $u_i$ writing $(U, P)_{fixed}$ | All the remaining sessions from $U_j$ writing $(U, P)_{fixed}$ |

Here, $U=\{u_1, \ldots, u_n\}$ refers to a set of all the users. For a legitimate user $u_i \in U$, the set of users excluding the legitimate user is: $U_j=\{u_j \in U | j \neq i\}$.

In another implementation, every user is required to perform n login sessions with their own login credentials (e.g., username and corresponding password). As such, a dataset is obtained to simulate a scenario where only data from the legitimate user login sessions are available to train the machine learning model. For example, for a financial institution's online banking system, it is relatively rare that a majority of its online users' accounts are hacked or attacked by malicious parties. In this scenario, for most of its users, the positive training dataset comes from the login sessions performed by legitimate users associated with the respective accounts. By the same token, a negative training dataset (e.g., data of an attack class) is obtained from other legitimate users entering their respective credentials during their login sessions. Table 2 provides an example of login sessions used to train and evaluate the machine learning model in this scenario.

TABLE 2

|  | Legitimate user class | Attack class |
| --- | --- | --- |
| Train | n sessions of $u_i$ writing $(U, P)_{fixed}$ | n random sessions from $U_j$ writing $(U, P)_{own}$ |
| Test | The remaining m sessions of $u_i$ writing $(U, P)_{fixed}$ | All sessions from $U_j$ writing $(U, P)_{fixed}$ |

In another implementation, the model's performance may be evaluated by measuring its resilience. In this example, every user is required to provide n login sessions with bath the fixed credential and their own credentials. The fixed credential based data is used as positive training data, and other for testing. Negative training data is obtained similarly as above-described with reference to table 2. As such, upon the legitimate users password change, the model is evaluated with regard whether the legitimate user can be authenticated properly. Table 3 provides an example of login sessions used to train and evaluate the machine learning model in this scenario.

TABLE 3

| | Legitimate user class | Attack class |
|---|---|---|
| Train | n sessions of $u_i$ writing $(U, P)_{fixed}$ | n random sessions from $U_j$ writing $(U, P)_{own}$ |
| Test | All sessions of $u_i$ writing $(U, P)_{own}$ | All the remaining sessions from $U_j$ writing $(U, P)_{own}$ |

In yet another implementation, every user is required to provide n login sessions with their own credentials. Such data is used for both the training and testing phases. Table 4 provides an example of login sessions used to train and evaluate the machine learning model in this scenario.

TABLE 4

| | Legitimate user class | Attack class |
|---|---|---|
| Train | n sessions of $u_i$ writing $(U, P)_{own}$ | n random sessions from $U_j$ writing $(U, P)_{own}$ |
| Test | The remaining m sessions of $u_i$ writing $(U, P)_{own}$ | All the remaining sessions from $U_j$ writing $(U, P)_{own}$ |

In some embodiments, various types of machine learning models can be applied including, supervised learning, semi-supervised learning, and/or reinforcement learning based models. In one implementation, supervised learning models can include: random forest, decision trees, support vector machines, linear regression models, and/or neural networks. In some embodiments, a plurality of machine learning models are applied in parallel manner or in a sequential manner.

Figure 5:
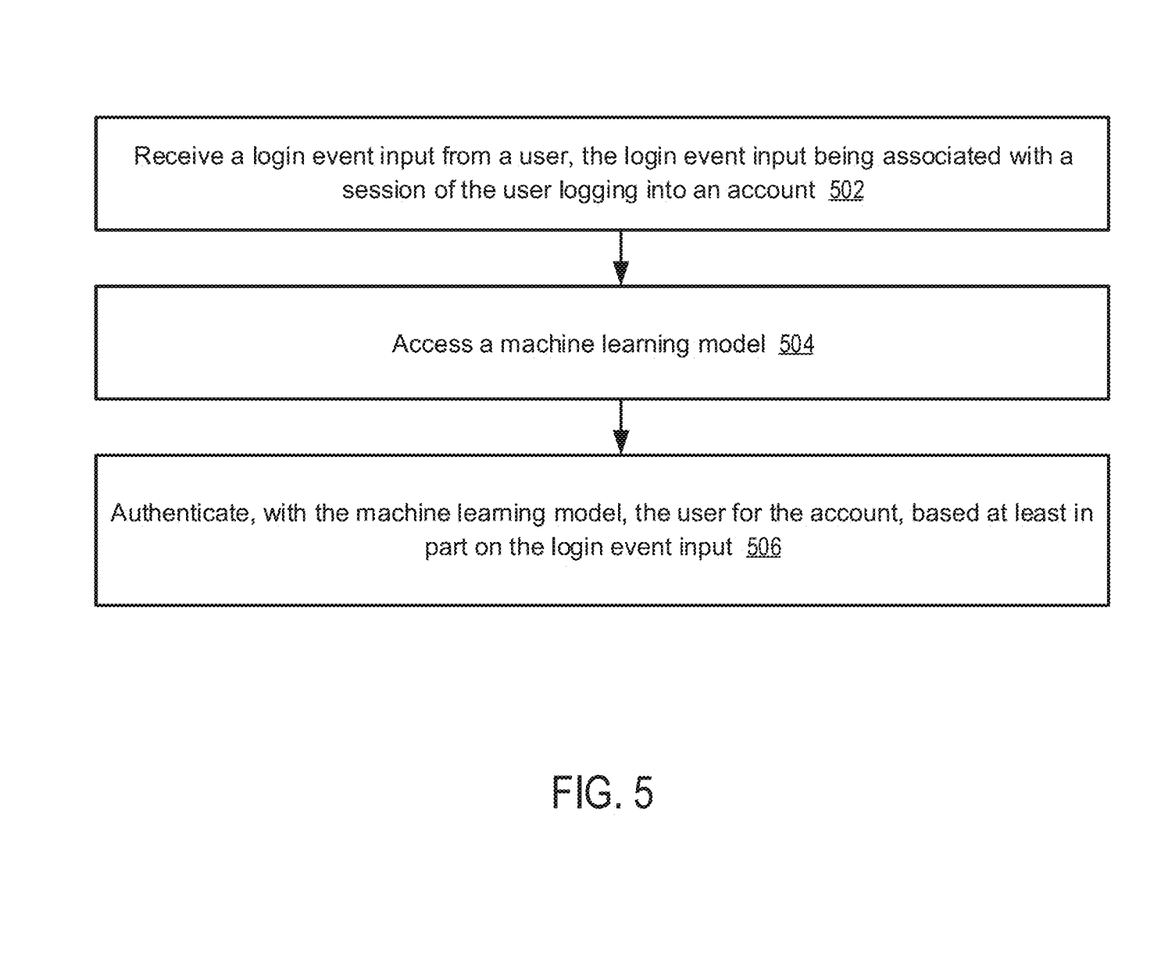
FIG. 5 shows a flowchart of an exemplary biometrics based user login authentication according to various embodiments of the present disclosure.

FIG. 5 shows a flowchart of an exemplary method for biometric data based user login authentication according to some embodiments of the present disclosure. Authentication for a user is initiated, at 502, by receiving a login input from the user, the login input being associated with a session of the user logging into an account. In some embodiments, the login event input includes one or more items of biometric data associated with the user. In some embodiments, the one or more items of biometric data is generated by interactions of the user with one or more input devices for logging into the account to communicate a login credential of the user. In some embodiments, the one or more items of biometric data include one or more of: mouse event related biometric data, and keyboard event related biometric data. In some embodiments, the login credential includes a username and corresponding password.

At 504, a machine learning model is accessed. In some embodiment, the machine learning model is trained by a plurality of login events associated with the user logging into the account. In some embodiments, the machine learning model is trained by a pre-determined threshold number of training sessions. In some embodiment, the threshold number is from about 3 to about 7. In some embodiments, the machine learning model is trained with data that is user computing platform/environment neutral. In some embodiment, the machine learning model is based on a random forest classifier. In some embodiments, the machine learning model is trained in a biased manner that is tolerant of false positive authentication results and sensitive to false negative authentication results. In some embodiments, the machine learning model is trained applying an oversampling technique to a plurality of login event inputs associated with authenticated user logins. In some embodiments, the machine learning model is trained with one or more of: a dataset of biometric data associated with the user logging into the account using a same credential, a dataset of biometric data associated with the user logging into the account using a different credential, a dataset of biometric data associated with other users logging into the account using the same credential, or a dataset of biometric data associated with attackers logging into the account.

At 506, the user is authenticated with the machine learning model, based on the received login event input. In some embodiments, authentication of the user for the account comprises initiating a process of secondary authentication for the user. In some embodiments, the authentication of the user includes application in conjunction with other risk-based authentication techniques. In some embodiments, authentication of the user for the account comprises granting the user access to the account upon successful authenticating the user as the legitimate user of the account. In some embodiments, authentication of the user for the account comprises denying the user access to the account upon failing to authenticate the user as the legitimate user of the account.

Figure 6:
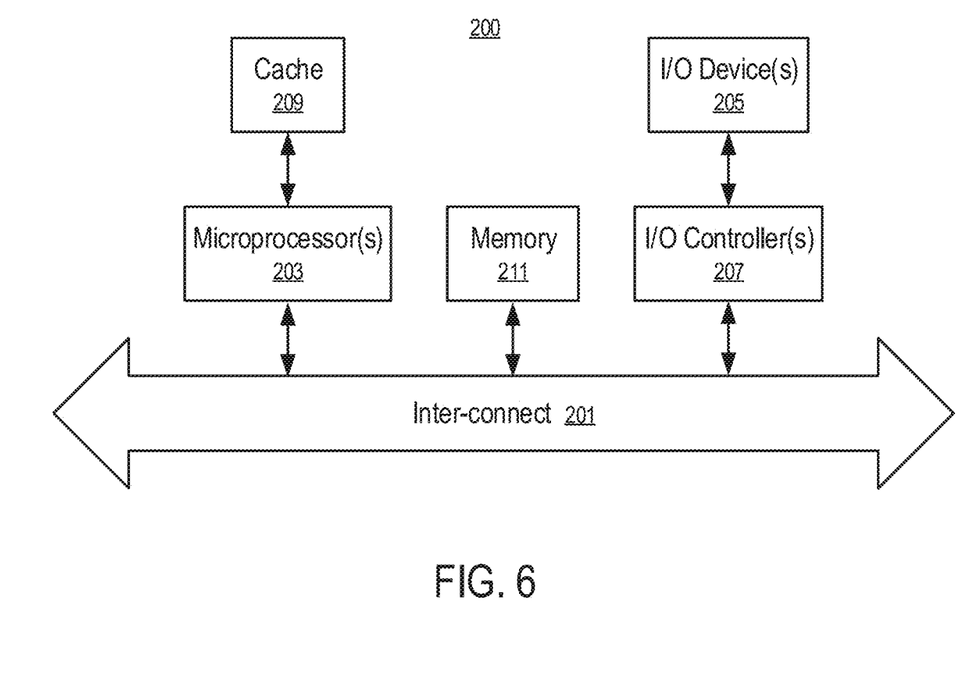
FIG. 6 shows an exemplary computing system that can be used to implement some components of embodiments of the present disclosure.

FIG. 6 shows a data processing system that can be used to implement some components of embodiments of the present disclosure. While FIG. 6 illustrates various components of a computer system, it is not intended to represent any particular architecture or manner of interconnecting the components. Other systems that have fewer or more components than those shown in FIG. 6 can also be used.

In FIG. 6, the data processing system (200) includes an inter-connect (201) (e.g., bus and system core logic), which interconnects a microprocessor(s) (203) and memory (211). The microprocessor (203) is coupled to cache memory (209) in the example of FIG. 6.

In FIG. 6, the inter-connect (201) interconnects the microprocessor(s) (203) and the memory (211) together and also interconnects them to input/output (I/O) device(s) (205) via I/O controller(s) (207). I/O devices (205) may include a display device (e.g., touchscreen display) and/or peripheral devices, such as mice, keyboards, trackpads, trackballs, styluses, modems, network interfaces, printers, scanners, video cameras and other devices known in the art. When the data processing system is a server system, some of the VO devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving a login event input from a user, the login event input being associated with a session of the user logging into an account;
accessing a machine learning model;
authenticating, with the machine learning model, the user for the account, based at least in part on the login event input;
the login event input comprises one or more items of biometric data associated with the user;
an item of the one or more items of biometric data associated with the user is generated by interaction of the user with an input device for logging into the account, the interaction communicating a login credential of the user;
an item of the one or more items of biometric data associated with the user is keyboard event related biometric data, or mouse event related biometric data;
the machine learning model is trained by a plurality of login event inputs associated with sessions of the user logging into the account;
the machine learning model has been trained by a predetermined threshold number of sessions of the user logging into the account; and
a vector of mouse features is fused with a vector of keyboard features to generate a vector of login features.

2. The method of claim 1, wherein an item of the one or more items of biometric data is obtained by monitoring the user interaction with an input device during the session.

3. The method of claim 1, wherein the keyboard event related biometric data comprises a set of features associated with keystrokes of the user during the session.

4. The method of claim 1, wherein the mouse event related biometric data comprises a set of features associated with dynamics of a mouse movement of the user during the session.

5. The method of claim 1, wherein features of biometric data is generated independently of an environment of the user during the sessions.

6. The method of claim 1, wherein the machine learning model is trained by a different vector based on a plurality of historical user login sessions.

7. The method of claim 1, wherein the machine learning model is based on a random forest classifier.

8. The method of claim 1, wherein the machine learning model is trained in a biased manner that is tolerant of false positive authentication results and sensitive to false negative authentication results.

9. The method of claim 1, wherein the machine learning model is trained by applying an oversampling technique to a plurality of login event inputs associated with authenticated user logins.

10. The method of claim 1, wherein the machine learning model is trained with one or more of: a dataset of biometric data associated with the user logging into the account using a same credential, a dataset of biometric data associated with the user logging into the account using a different credential, a dataset of biometric data associated with other users logging into the account using the same credential, or a dataset of biometric data associated with other users logging into their accounts.

11. The method of claim 1, wherein the authentication of the user for the account comprises initiating a process of secondary authentication for the user.

12. A tangible, non-transitory computer-readable medium storing instructions that, when executed, cause a computer system to:
receive a login event input from a user, the login event input being associated with a session of the user logging into an account;
access a machine learning model;
authenticate, with the machine learning model, the user for the account, based at least in part on the login event input;
the login event input comprises one or more items of biometric data associated with the user;
an item of the one or more items of biometric data associated with the user is generated by interaction of the user with an input device for logging into the account, the interaction communicating a login credential of the user;
an item of the one or more items of biometric data associated with the user is keyboard event related biometric data, or mouse event related biometric data;
the machine learning model is trained by a plurality of login event inputs associated with sessions of the user logging into the account;
the machine learning model has been trained by a predetermined threshold number of sessions of the user logging into the account; and
a vector of mouse features is fused with a vector of keyboard features to generate a vector of login features.

13. The computer-readable medium of claim 12, wherein the login event input comprises mouse movement features associated with the user performing a login into the account.

14. A system comprising:
a processor; and
memory in communication with the processor and storing instructions that,
when executed by the processor, cause the system to:
receive a login event input from a user, the login event input being
associated with a session of the user logging into an account;
access a machine learning model; authenticate, with the machine learning model, the user for the account, based at least in part on the login event input;
the login event input comprises one or more items of biometric data associated with the user;
an item of the one or more items of biometric data associated with the user is generated by interaction of the user with an input device for logging into the account, the interaction communicating a login credential of the user;
an item of the one or more items of biometric data associated with the user is keyboard event related biometric data, or mouse event related biometric data;

the machine learning model is trained by a plurality of login event inputs associated with sessions of the user logging into the account;

the machine learning model has been trained by a predetermined threshold number of sessions of the user logging into the account; and a vector of mouse features is fused with a vector of keyboard features to generate a vector of login features.

* * * * *